April 6, 1954
W. T. GRAHAM
2,674,172
MOUNTING FOR THE SHANKS OF THE
GROUND WORKING TOOLS IN A PLOW
Filed Nov. 1, 1951
2 Sheets-Sheet 2
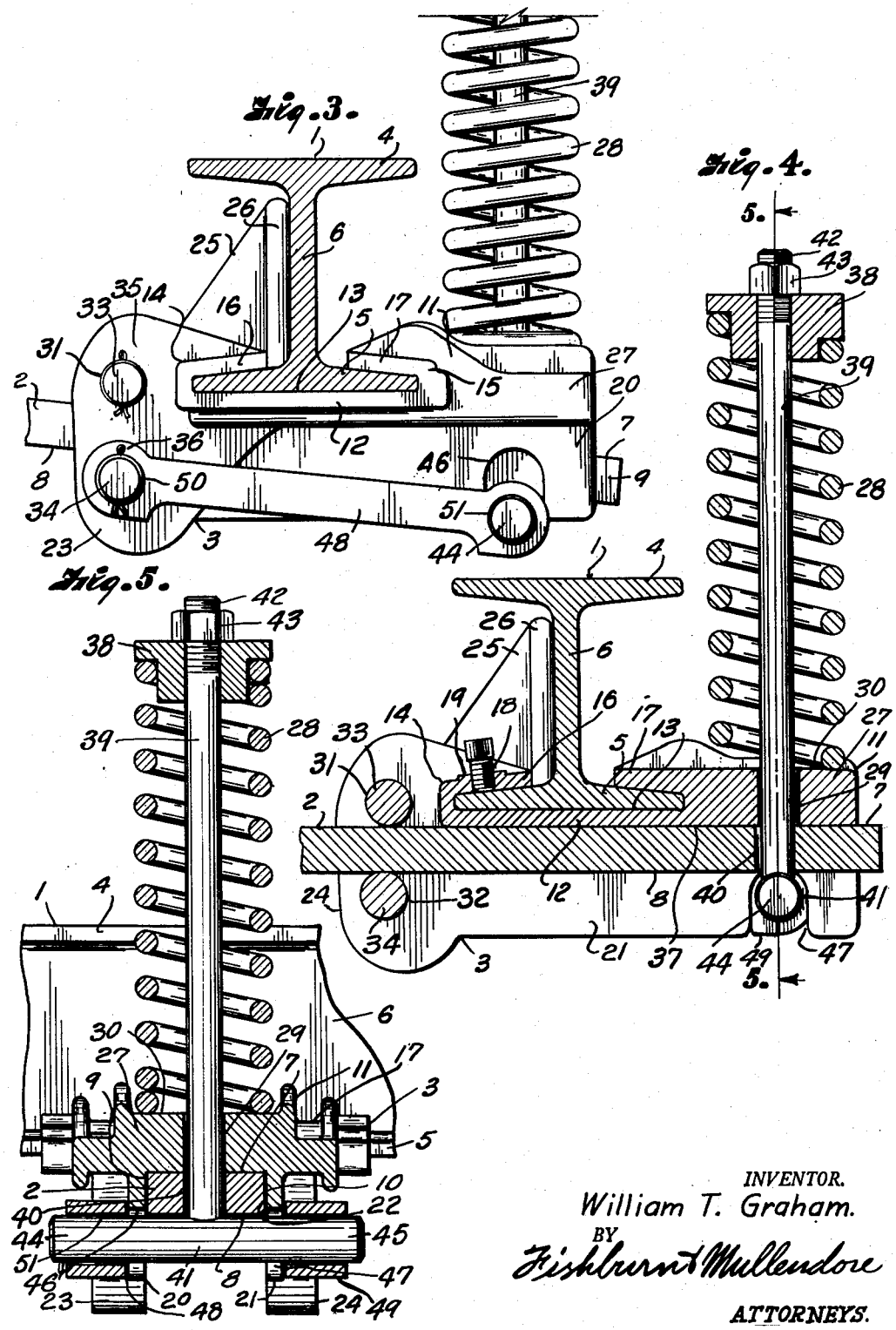
INVENTOR.
William T. Graham.
BY
Fishburn & Mullendore
ATTORNEYS.

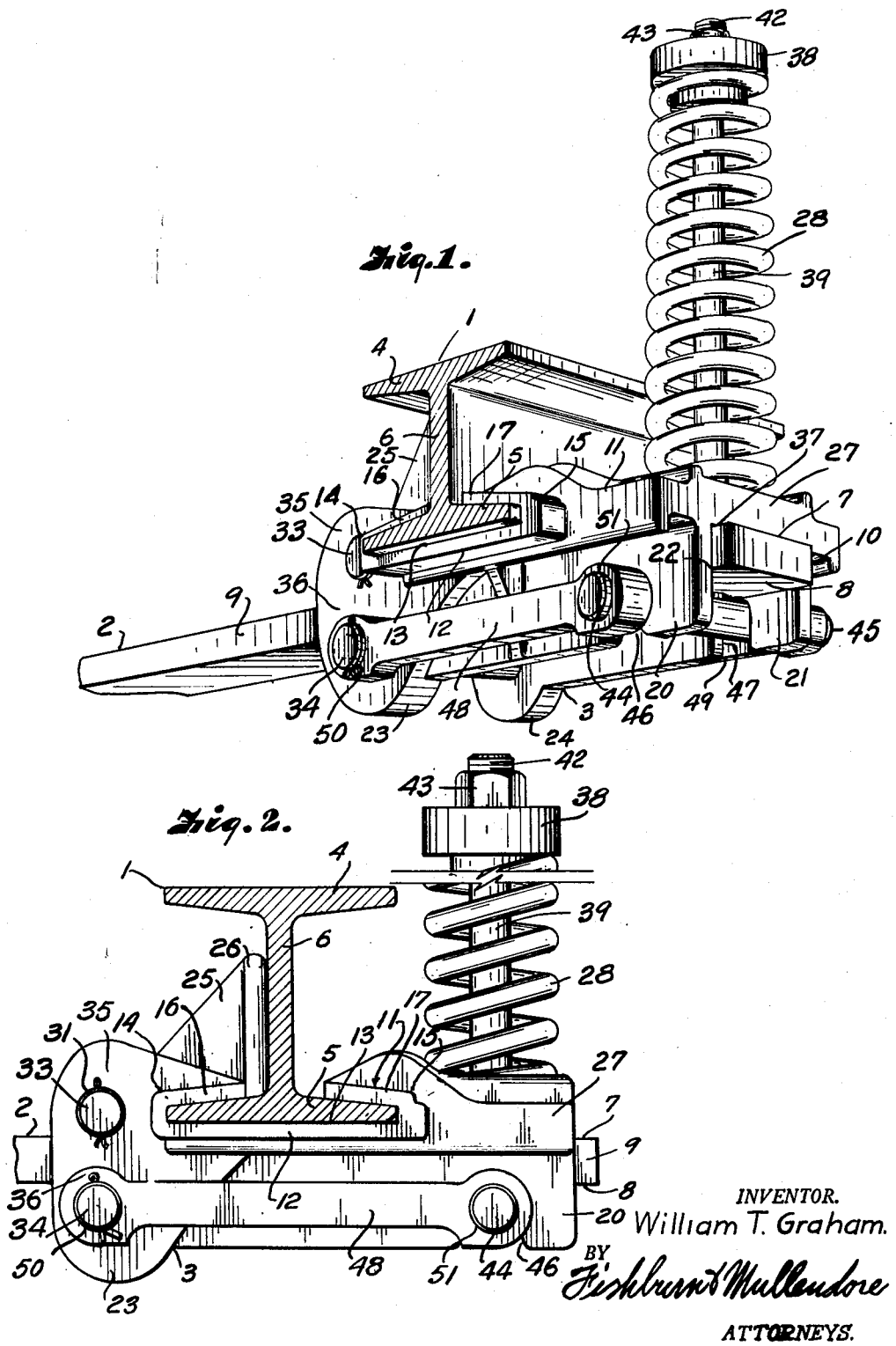

Patented Apr. 6, 1954

2,674,172

UNITED STATES PATENT OFFICE 2,674,172

MOUNTING FOR THE SHANKS OF THE GROUND WORKING TOOLS IN A PLOW

William T. Graham, Amarillo, Tex., assignor to The First National Bank of Amarillo, Amarillo, Tex., a national banking corporation Application November 1, 1951, Serial No. 254,241

2 Claims. (Cl. 97—47.84)

This invention relates to a mounting for the shanks of ground working tools for plows of the type disclosed in United States Letters Patent No. 2,493,811 granted to me on January 10, 1950. The mounting disclosed in the patent includes a fixed clamping part adapted to be rigidly attached to the plow frame, a movable clamping part pivotally mounted on the fixed part for retaining the ends of the shanks therebetween under the action of a spring having one end engaging the fixed clamping part and the other end connected with the movable clamping part by means of a rod extending through the respective clamping parts and shank of the ground working tool and which also retains the shank in position between the clamping parts.

It is the principal object of the present invention to provide a mounting of this character which is of simpler construction and of lighter weight through elimination of the movable clamping part of the mounting and provide for directly pivoting the shank on the fulcrum pin and direct connection of the rod with the plow shank.

A further object of the invention is to eliminate tendency of the connecting rod to bind between the fixed part and the shank by the provision of link means directly connecting the rod with the fulcrum pin.

In accomplishing these and other objects of the invention hereinafter pointed out, I have provided improved structure, the preferred form of which is illustrated in the accompanying drawings, wherein:

Fig. 1 is a perspective view of a portion of the plow frame and shank of a ground working tool equipped with a shank mounting constructed in accordance with the present invention.

Fig. 2 is a side elevational view of the mounting, the plow frame member being shown in cross section.

Fig. 3 is a similar view but showing the shank in vibratory or rocking action.

Fig. 4 is a longitudinal central section through the clamp.

Fig. 5 is a cross section on the line 5—5 of Fig. 4.

Referring more in detail to the drawings:

1 designates a transverse beam of a plow frame to which shanks 2 of ground working tools (not shown) are attached by mountings 3 constructed in accordance with the present invention. The transverse beam 1 is of I shape cross section and has upper and lower flanges 4 and 5 connected by a web 6. Since all of the shanks 2 and mountings 3 are of identical construction, only one is illustrated in the drawings.

The shank 2 consists of a bar having its forward end extending transversely under the beam and its rear end curving downwardly and forwardly to carry a ground working tool (not shown) which forms no specific part of the present invention and therefore is not illustrated. The shank 2 is of rectangular cross section and has substantially flat upper and lower faces 7 and 8 and side faces 9 and 10.

The mounting 3, like the mounting of the patent, includes a fixed part 11 having a plate portion 12 provided with a flat upper face 13 corresponding with the width of the lower flange 5 and which is retained in close engagement therewith by flanges 14 and 15 that project upwardly from the plate portion 12 at the front and rear sides of the beam, and which have portions 16 and 17 overlapping the upper faces of the I beam flange 5 as shown in Figs. 2, 3 and 4.

The width of the plate portion 12 is such as to provide ample contact area with the under side of the flange 5 so as to assure firm connection when the clamping part is secured to the beam member 1 by a fastening device such as a setscrew 18 threaded through a boss 19 on the inturned portion 16 of the flange 14 so that the shank with the setscrew bears against the lower flange and draws the plate portion 12 of the clamping part tightly against the bottom face of the beam 1.

Depending from the under side of the plate portion 12 are laterally spaced parallel flanges 20 and 21 to provide an open bottom channel or way 22 conforming to the width of the shank 2 and in which the shank 2 is adapted to rock as later described. The flanges 20 and 21 extend rearwardly from the plate portion 12 and upwardly over the flange 14 to provide rearwardly projecting, spaced apart ears 23 and 24 that are preferably thicker than the depending flanges. Extending upwardly from the portion of the ears overlying the flanges 14 are webs 25 carrying pads 26 that are adapted to bear against the rear face of the web 6 for distributing the forces applied to the clamp under action of the shank 2 to the upper part of the beam.

The forward side of the plate 12 and flanges 20 and 21 project a sufficient distance from the beam member 1 to provide a support 27 for a spring 28. The supporting portion 27 is relatively thick to provide the necessary strength and to accommodate an opening 29, Figs. 4 and 5, which extends therethrough in the axis of a spring seat 30 that is provided upon the upper side of the plate extension as best shown in Fig. 4.

The ears 23 and 24 are each provided with upper and lower openings 31 and 32 that are spaced apart in accordance with the thickness of the shank 2 for mounting the ends of fulcrum pins 33 and 34. The shank 2 is passed between the fulcrum pins so that the upper and lower faces 7 and 8 thereof may contact the fulcrum pins incidental to rocking of the shank as later described. The pins 33 and 34 are retained in position by cotter pins 35 and 36 which extend through the outer ends of the pins.

The shank, when at rest, is normally retained with the upper face 7 in clamped contact with the top face 37 of the downwardly opening channel or way 22 by means of the spring 28 as now to be described. The spring 28 is in the form of a coil having one end engaging the spring seat 30 and its opposite end extending above the beam 1 and supporting a spring seat 38. The spring 28 is retained in compression between the seats 30 and 38 by means of a connecting rod 39. The rod 39 also provides a stop for the shank in a fore and aft direction because of its passage through the opening 29 of the fixed part and through an opening 40 in the shank (Figs. 4 and 5).

The rod 28 has a transverse T head 41 on its lower end and its other end is provided with threads 42 for mounting a nut 43. The head 41 is of longer length than the spacing between the flanges 20 and 21 to provide trunnions 44 and 45. Therefore, the spaced flanges 20 and 21 are provided with downwardly opening notches 46 and 47 so that the T head is drawn tightly against the under face 8 of the shank and the upper face 7 of the shank in the clamping engagement with the face 37 of the downwardly opening channel, as best shown in Fig. 4, the nut 42 being tightened to give the desired spring action and pivoting movement of the plow shank 2 so that the ground working tool may ride over a rock or other obstruction.

In order that the shank may rock on the fulcrum pin 34, the openings 29 and 40 are elongated in the longitudinal direction of the clamp as indicated in Fig. 4. With the structure thus far described, rocking movement of the forward end of the shank downwardly away from the fixed part 11, and resistance of the ground working tool to the forward movement of the plow will cause the connecting rod to bind within the openings 29 and 40. However, to avoid tendency of the connecting rod to bind or bend under pull of the shank and to relieve wear upon the rod where it passes through the openings 29 and 40, the mounting is provided with links 48 and 49 each having openings 50 and 51 in the respective ends thereof to mount the links on projecting ends of the fulcrum pin 34 and on the projecting trunnion portions 44 and 45 of the head 41 of the rod 39.

The links 48 and 49 thus pivot with the shank against action of the spring 28 and apply the rearward pulling forces of the shank to the fixed part 11 through the fulcrum pin 34. The retractive movement of the shank is therefore limited by the links 48 and 49 and the tilting movement of the connecting rod 39 is limited as the rod moves downwardly through the opening 29 of the fixed part 11.

The upper fulcrum pin 33 provides support for the shank when the thrusts of the ground working tool are transmitted upwardly in the direction of the plate portion 12 of the clamp, the upper fulcrum pin 33 being located so that it takes the wear from the rear edge of the plate portion of the fixed part 11. The pin 33, when worn, may be easily removed and replaced with a new pin without requiring replacement of the entire fixed part 11 of the mounting 3.

It is obvious that the shank 2 of the ground working tool is directly supported between the fulcrum pins 33 and 34 and that the connecting rod 39 provides a direct support for the free end of the shank without the use of the pivotal clamping part as described in the above mentioned patent.

The spring 28 controls the pivotal action of the shank. If greater action is required, the nut 42 is backed off to allow expansion of the spring. If less action is required, the nut is tightened against the spring so that the spring more firmly resists vibratory or pumping action of the plow shank.

From the foregoing, it is obvious that I have provided a plow structure wherein the shanks of the ground working tools are adapted to be attached to the plow in a manner to permit the desired action and that the mounting is of simple and less expensive construction.

What I claim and desire to secure by Letters Patent is:

1. A mounting for attaching and supporting the shank of a ground working tool from the frame of a plow including a bracket member fixed to the plow frame and having an under face and spaced apart depending portions forming a downwardly opening way for accommodating an end portion of the shank therebetween, a pin extending through said depending portions and across said downwardly opening way to provide a bearing portion in contact with said shank and on which the shank is adapted to rock to and away from said under face, said pin having ends projecting from outer sides of said depending portions, a spring having one end seated on the bracket, a rod having connection with the other end of the spring and extending through registering openings in the bracket and said end portion of the shank, a T-head on the rod and forming a support for said end portion of the shank in cooperation with the spring for resiliently retaining the end portion of the shank in contact with said face, said head having ends projecting beyond opposite sides of the shank, and links at opposite sides of the shank and pivotally inter-connecting the projecting ends of the pins with the projecting ends of the T-head for supporting the shank under longitudinal thrusts independently of the bearing portion of the pin when the shank rocks on said pin against action of the spring.

2. A mounting for attaching and supporting the shank of a ground working tool from the frame of a plow including a bracket member fixed to the plow frame and having a shank contacting face and spaced apart depending flange portions on opposite sides of said face for accommodating an end portion of the shank therebetween, a pin extending through said depending flanges at one end thereof to provide a bearing portion in contact with said shank and on which the shank is adapted to rock to and from said face, said pin having ends projecting from outer sides of said depending flanges, the opposite ends of said flanges being provided with downwardly opening notches, a spring having one end seated on the bracket above said notched ends of the flanges, a rod having connection with the other end of the spring and extending through registering openings in the bracket and said end portion of the shank, a T-head on the rod and forming a support for said end portion of the shank in cooperation with the spring for resiliently retaining the end of shank in contact with said face, said head having ends extending through said notches and projecting from said notches on outer sides of the depending flanges, links at opposite outer sides of the flanges and pivotally interconnecting the projecting ends of the pins with the projecting ends of the T-head for supporting the shank against longitudinal thrusts independently of the rocking thrust applied to the bearing portion of the pin when the shank rocks on said pin against action of said spring.

References Cited in the file of this patent

UNITED STATES PATENTS

| Number | Name | Date |
|---|---|---|
| 2,493,811 | Graham | Jan. 10, 1950 |

FOREIGN PATENTS

| Number | Country | Date |
|---|---|---|
| 269,394 | Great Britain | Apr. 21, 1927 |